United States Patent
Yamada

(10) Patent No.: US 8,290,648 B2
(45) Date of Patent: Oct. 16, 2012

(54) CHARGE-DISCHARGE MANAGEMENT APPARATUS AND COMPUTER READABLE MEDIUM COMPRISING INSTRUCTIONS FOR ACHIEVING THE APPARATUS

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 1103 days.

(21) Appl. No.: 12/214,378

(22) Filed: Jun. 18, 2008

(65) Prior Publication Data

US 2008/0319596 A1 Dec. 25, 2008

(30) Foreign Application Priority Data

Jun. 20, 2007 (JP) ................................ 2007-162507
Oct. 24, 2007 (JP) ................................ 2007-276497

(51) Int. Cl.
*B60L 9/00* (2006.01)
(52) U.S. Cl. ........................................................ 701/22
(58) Field of Classification Search .................. None
See application file for complete search history.

(56) References Cited

U.S. PATENT DOCUMENTS

| 6,314,347 | B1 | 11/2001 | Kuroda et al. | |
|---|---|---|---|---|
| 7,958,958 | B2 * | 6/2011 | de la Torre Bueno | 180/65.29 |
| 2003/0015358 | A1 * | 1/2003 | Abe et al. | 180/65.3 |
| 2003/0045999 | A1 * | 3/2003 | Joerg et al. | 701/209 |
| 2006/0232277 | A1 * | 10/2006 | Murakami et al. | 324/433 |
| 2007/0005235 | A1 | 1/2007 | Suzuki et al. | |
| 2007/0139015 | A1 * | 6/2007 | Seo et al. | 320/132 |
| 2007/0294026 | A1 * | 12/2007 | Schirmer | 701/202 |
| 2008/0054848 | A1 * | 3/2008 | Yun et al. | 320/134 |
| 2010/0063720 | A1 * | 3/2010 | Machino | 701/201 |

FOREIGN PATENT DOCUMENTS

| JP | 05-313574 | 11/1993 |
|---|---|---|
| JP | 11/051681 | 2/1999 |
| JP | 2000-333305 | 11/2000 |
| JP | 2001-183150 | 7/2001 |
| JP | 2001-314004 | 11/2001 |
| JP | 2004-101245 | 4/2004 |
| JP | 2004-248455 | 9/2004 |
| JP | 2007-010572 | 1/2007 |
| JP | 2007-050888 | 3/2007 |

OTHER PUBLICATIONS

Notice of Reasons for Rejection mailed Nov. 16, 2010 in a corresponding Japanese Application No. 2007-276497 with English translation.
U.S. Appl. No. 12/214,379, filed Jun. 18, 2008, Yamada.

* cited by examiner

*Primary Examiner* — Thomas Tarcza
*Assistant Examiner* — Nagi Murshed
(74) *Attorney, Agent, or Firm* — Harness, Dickey & Pierce, PLC

(57) ABSTRACT

After a final estimated route for a hybrid vehicle is specified, a navigation ECU determines a start point of a scheduled path, which a charging schedule is to be created for. The start point corresponds to a position at a travel distance, which is equivalent to a distance traveled from a present position of the hybrid vehicle along the estimated route for a time period required for creating a charging schedule.

9 Claims, 8 Drawing Sheets

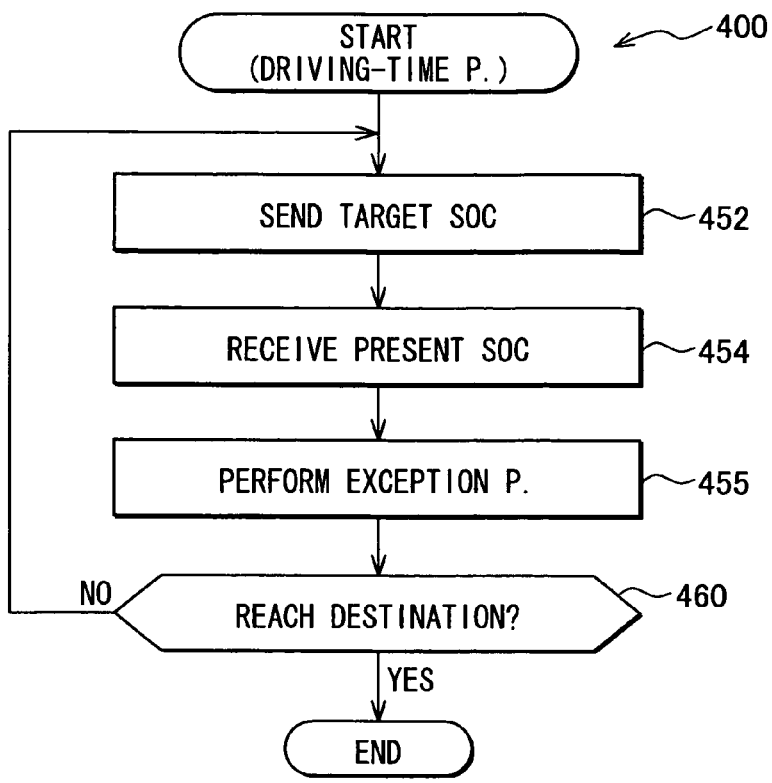
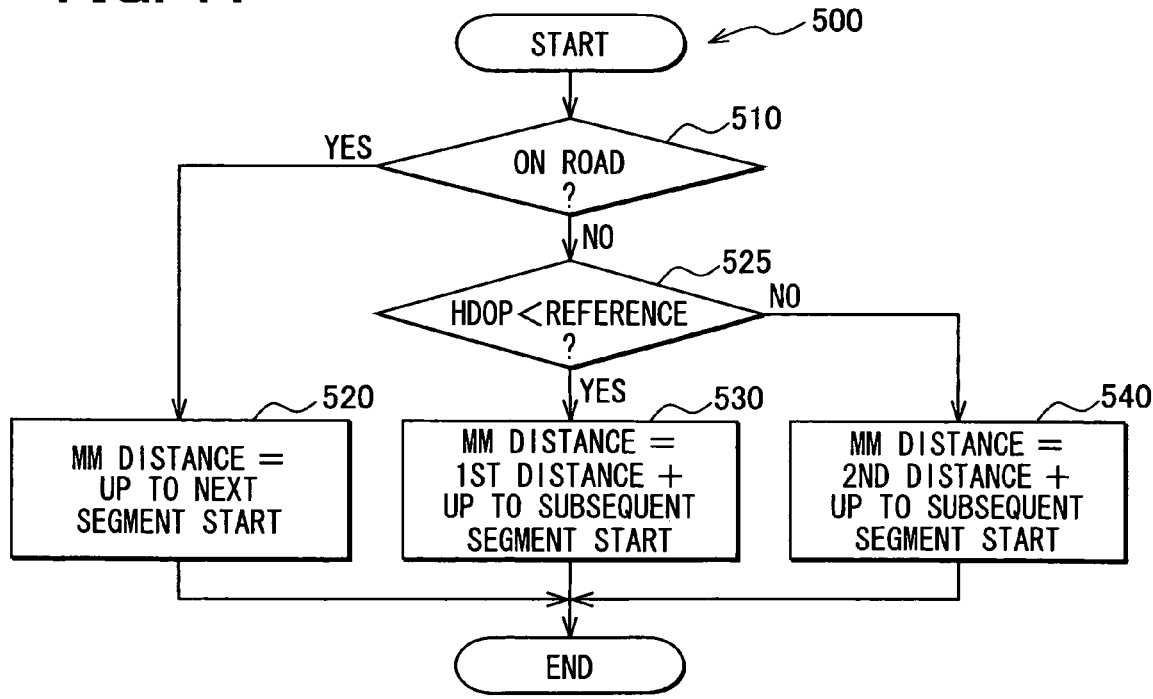

CHARGE-DISCHARGE MANAGEMENT APPARATUS AND COMPUTER READABLE MEDIUM COMPRISING INSTRUCTIONS FOR ACHIEVING THE APPARATUS

CROSS REFERENCE TO RELATED APPLICATION

This application is based on and incorporates herein by reference Japanese Patent Applications No. 2007-162507 filed on Jun. 20, 2007 and No. 2007-276497 filed on Oct. 24, 2007.

FIELD OF THE INVENTION

The present invention relates to a charge-discharge management apparatus for a hybrid vehicle, and further relates to a computer readable medium comprising instructions for achieving the charge-discharge management apparatus.

BACKGROUND OF THE INVENTION

There has been provided a hybrid vehicle using as a power source for running (i) an internal combustion engine driven by fuel combustion and (ii) a motor driven by a battery. As disclosed in Patent Documents 1 and 2, for example, a charge-discharge management apparatus is known so as to save fuel consumed by the internal combustion engine of the hybrid vehicle. The charge-discharge management apparatus creates a schedule concerning whether or not to operate the internal combustion engine and the motor and charge the battery along an estimated route. The charge-discharge management apparatus allows a control apparatus to provide control in accordance with the schedule.
Patent Document 1: JP 2000-333305 A (corresponding to U.S. Pat. No. 6,314,347)
Patent Document 2: JP 2001-183150 A However, the scheduling is time-consuming. By the time the scheduling is complete and the control starts in accordance with the schedule, the hybrid vehicle may have already finished traveling part of the estimated route to be scheduled. Prolonging the time for scheduling increases a distance traveled by the hybrid vehicle before the control starts in accordance with the schedule.

In this manner, there may be a difference between a start point for a scheduled path and a start point for the control in accordance with the schedule. Increasing the difference also increases a difference between the actual remaining battery quantity at the start point for the control and the scheduled remaining battery quantity at the same point. As a result, the scheduled control becomes less effective.

In a worst case, a phenomenon as shown in FIG. 13 occurs. FIG. 13 shows an estimated route 63 settled between a start point 61 and a destination 62. If the scheduling starts at the start point 61, a hybrid vehicle has already traveled to a point 64 until completion of the scheduling. The result is to increase a difference at the point 64 between the scheduled remaining battery quantity and the actual remaining battery quantity. Another automatic or manual rescheduling is further needed.

If the second scheduling starts at the point 64, the hybrid vehicle has already proceeded to a point 65 until completion of the scheduling. The result is to increase a difference at the point 65 between the remaining battery quantity according to the schedule and the actual remaining battery quantity. Yet another automatic or manual rescheduling is needed. There is repeated a cycle of scheduling, causing a difference between the scheduled and actual remaining battery capacities, and rescheduling. As a result, scheduled control is unavailable along the estimated route 63.

SUMMARY OF THE INVENTION

The present invention has been made in consideration of the foregoing. It is therefore an object of the present invention to reduce an adverse effect on control due to time-consuming scheduling when the control is provided in accordance with a schedule created by a charge-discharge management apparatus concerning whether or not to operate an internal combustion engine and a motor and to charge the battery along an estimated route.

As a first example of the present invention, a charge-discharge management apparatus for a battery of a hybrid vehicle is provided. Herein the hybrid vehicle uses an internal combustion engine driven by fuel combustion and a motor driven by the battery as a power source for running. The charge-discharge management apparatus includes the following. An estimated route specification control unit is configured to specify an estimated route expected to be traveled by the hybrid vehicle. A scheduling control unit is configured to, after the estimated route is specified, (i) determine a schedule about whether or not to drive the hybrid vehicle using the motor and to charge the battery on a scheduled path along the estimated route and (ii) estimate transition of a remaining quantity of the battery along the estimated route based on the schedule. A scheduled running control unit is configured, when the hybrid vehicle runs on the estimated route and enters the scheduled path, to (i) start a control over whether or not to drive the hybrid vehicle using the motor and to control charging of the battery in accordance with the schedule and (ii) continue the control on the scheduled path. A start point determination control unit is configured to, after the estimated route is specified, determine a start point of the scheduled path, the start point being assumed to be a reference position at a reference distance from a present position of the hybrid vehicle along the estimated route.

As a second example of the present invention, a charge-discharge management apparatus for a battery of a hybrid vehicle is provided. The hybrid vehicle uses an internal combustion engine driven by fuel combustion and a motor driven by the battery as a power source for running. The charge-discharge management apparatus includes the following. An estimated route specification control unit is configured to specify an estimated route expected to be traveled by the hybrid vehicle. A scheduling control unit is configured to (i) determine a schedule about whether or not to drive the hybrid vehicle using the motor and to charge the battery on a scheduled path along the estimated route and (ii) estimate transition of a remaining quantity of the battery along the estimated route based on the determined schedule. A scheduled running control unit is configured, when the hybrid vehicle runs on the estimated route and enters the scheduled path, to (i) start a control over whether or not to drive the hybrid vehicle using the motor and to control charging of the battery in accordance with the schedule and (ii) continue the control on the scheduled path. Herein, the scheduling control unit is configured to determine the schedule and estimate the transition of the remaining quantity by assuming a reference position to be a start point of the scheduled path, the reference position being located at a reference distance along the estimated route from a position where the hybrid vehicle is located when the scheduling control unit starts determining the schedule and estimating the transition of the remaining quantity of the battery.

As a third example of the present invention, a computer readable medium comprising instructions being executed by a computer is provided. The instructions includes a computer-implemented method for managing a battery of a hybrid vehicle, which uses an internal combustion engine driven by fuel combustion and a motor driven by the battery as a power source for running. The instructions comprises: specifying an estimated route expected to be traveled by the hybrid vehicle; determining, after the estimated route is specified, a start point of a scheduled path along the estimated route, the start point being assumed to be a reference position at a reference distance from a present position of the hybrid vehicle along the estimated route; determining a schedule about whether or not to drive the hybrid vehicle using the motor and to charge the battery on the scheduled path starting from the determined start point along the estimated route while estimating transition of a remaining quantity of the battery along the estimated route based on the schedule; and starting, when the hybrid vehicle runs on the estimated route and enters the scheduled path starting from the start point, a control over whether or not to drive the hybrid vehicle using the motor and to control charging of the battery in accordance with the determined schedule and continuing the control on the scheduled path.

As a fourth example of the present invention, a computer readable medium comprising instructions being executed by a computer is provided. The instructions includes a computer-implemented method for managing a battery of a hybrid vehicle, which uses an internal combustion engine driven by fuel combustion and a motor driven by the battery as a power source for running. The instructions comprises: determining a schedule about whether or not to drive the hybrid vehicle using the motor and to charge the battery on a scheduled path along an estimated route of the vehicle while estimating transition of a remaining quantity of the battery along the estimated route based on the schedule, the scheduled path starting from a start point, which is assumed to be a reference position at a reference distance from a position where the hybrid vehicle is located when the determining the schedule and estimating the transition of the remaining quantity of the battery is started; and starting, when the hybrid vehicle runs on the estimated route and enters the scheduled path starting from the start point, a control over whether or not to drive the hybrid vehicle using the motor and to control charging of the battery in accordance with the determined schedule and continuing the control on the scheduled path.

BRIEF DESCRIPTION OF THE DRAWINGS

The above and other objects, features, and advantages of the present invention will become more apparent from the following detailed description made with reference to the accompanying drawings. In the drawings:

FIG. 9 is a flow chart showing a driving-time process;

FIG. 11 is a flow chart showing details of estimated MM distance determination in the route estimation process;

DETAILED DESCRIPTION OF THE PREFERRED EMBODIMENTS

First Embodiment

The following describes a first embodiment of the present invention.

Figure 1:
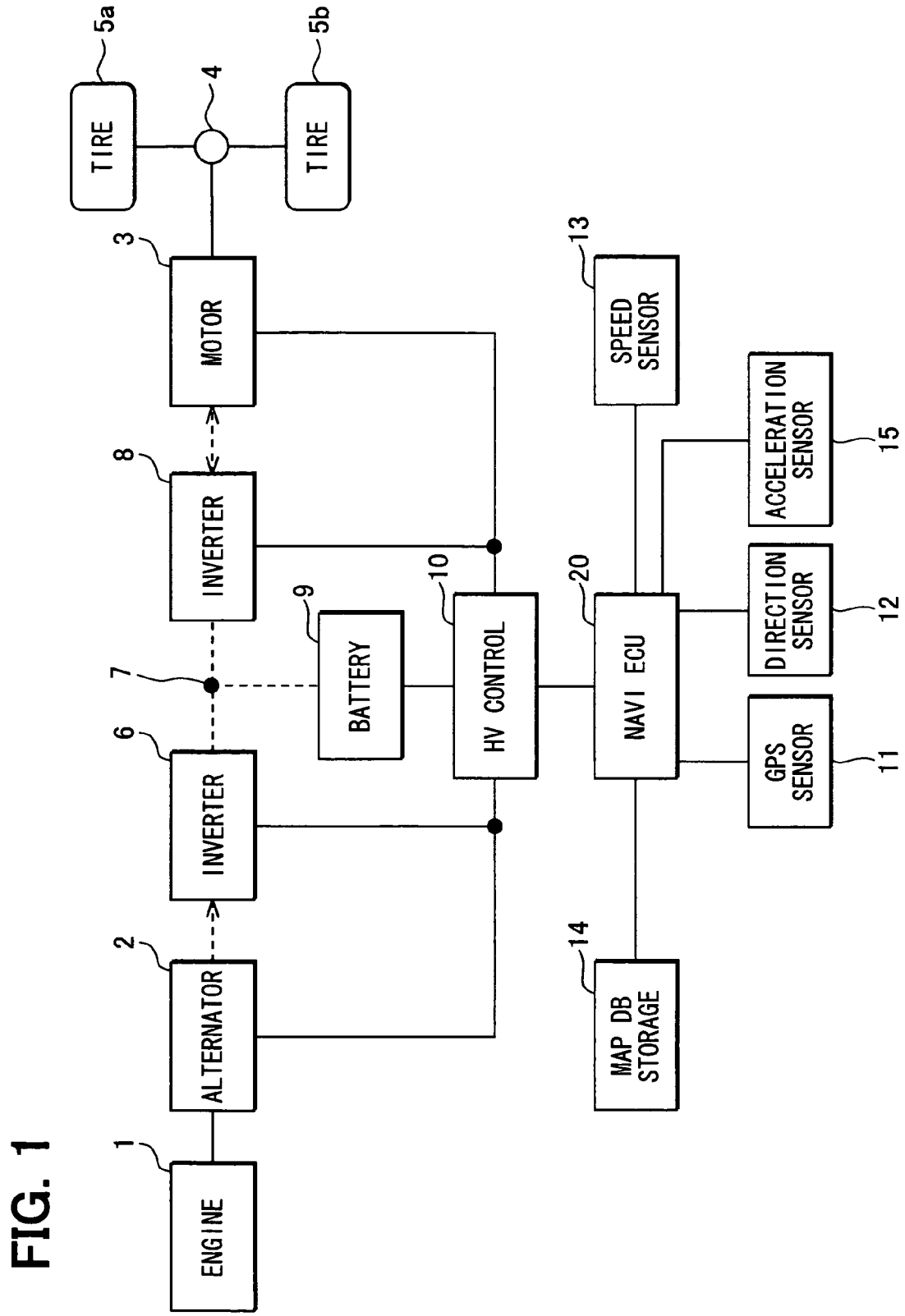
FIG. 1 schematically shows a construction of a hybrid vehicle according to an embodiment of the present invention.

FIG. 1 schematically shows a construction example of a hybrid vehicle according to the embodiment. The hybrid vehicle includes an engine 1 as an internal combustion engine, an alternator 2, a motor 3, a differential gear unit 4, a tire 5a, a tire 5b, an inverter 6, a DC link 7, an inverter 8, a battery 9, an HV (Hybrid Vehicle) control section 10, a GPS sensor 11, a direction sensor 12, a vehicle speed sensor 13, a map DB storage section 14, an acceleration sensor 15, and a navigation ECU 20.

The hybrid vehicle runs using the engine 1 and the motor 3 as a power source. When the engine 1 is used as the power source, a rotation of the engine 1 is transmitted to the tires 5a and 5b via an unshown clutch mechanism and the differential gear unit 4. When the motor 3 is used as the power source, a direct current of the battery 9 is converted into an alternating power via the DC link 7 and the inverter 8.

The motor 3 operates on the alternating power. A rotation of the motor 3 is transmitted to the tires 5a and 5b via the differential gear unit 4. The following description refers to two modes of driving, that is, engine driving and assist driving. The engine driving uses only the engine 1 as the power source. The assist driving uses at least the motor 3 as the power source including or excluding the engine 1.

The rotation of the engine 1 is also transmitted to the alternator 2. The rotation causes the alternator 2 to generate an alternating power. The generated alternating power is converted into a direct power via the inverter 6 and the DC link 7. The direct current power may be charged in the battery 9. That is, the engine 1 operates using fuel to charge the battery 9. This type of charging is hereafter referred to as internal combustion charging.

When an unshown braking mechanism decelerates the hybrid vehicle, a resisting force during the deceleration is added as a torque to the motor 3. The torque allows the motor 3 to generate an alternating power. The generated alternating power is converted into a direct power via the inverter 8 and the DC link 7. The direct power is charged in the battery 9. In the following description, this type of charging is referred to as regenerative charging.

In accordance with an instruction from the navigation ECU 20 or the like, the HV control section 10 controls whether or not to operate the alternator 2, the motor 3, the inverters 6 and 8, and the battery 9. The HV control section 10 may use a microcomputer or hardware device having a dedicated circuit construction for embodying the following functions.

For example, the HV control section 10 stores two values, that is, a present SOC (State Of Charge) and a reference SOC (equivalent to an example of reference remaining quantity). The HV control section 10 performs the following processes (A) and (B).

(A) Based on an instruction from the navigation ECU 20, the HV control section 10 controls actuators for the alternator 2, the motor 3, the inverters 6 and 8, and the battery 9 in an autonomous control mode or passive control mode.

(B) The HV control section 10 periodically reports the present SOC to the navigation ECU 20.

The SOC (State of Charge) is an index for indicating the remaining battery quantity. A higher value indicates a larger remaining quantity. The present SOC indicates the SOC of the battery 9 at the present time. The HV control section 10 repeatedly updates the present SOC value by successively detecting states of the battery 9. The reference SOC provides a value such as 60% used for the autonomous control mode.

The autonomous control mode and the passive control mode are described below. In the autonomous control mode, the HV control section 10 controls the actuators based on determination of a driving method and a determined driving method so that the present SOC may be maintained in the reference SOC and approximate values thereof. For instance, the driving method chooses between the engine driving and the assist driving and between the internal combustion charging and the regenerative charging. In the autonomous control mode, the HV control section 10 determines the driving method and provides control in accordance with the determination, independently of the navigation ECU 20, based on the present SOC as the quantity acquired only from the present vehicle situation, not on a value for an estimated vehicle situation in the future.

In the passive control mode, the HV control section 10 chooses between the engine driving and the assist driving as driving mode for the hybrid vehicle based on a control signal from the navigation ECU 20. The HV control section 10 also provides control for changing between the internal combustion charging and the regenerative charging to be performed. In the embodiment, the control signal is equivalent to a signal for a target SOC to be described. The HV control section 10 controls the actuators based on the determination of the driving method and the determined driving method so that the present SOC can be maintained in the target SOC and approximate values of the target SOC.

As will be described later, the target SOC is a quantity determined based on advance scheduling of a driving method for the vehicle. The HV control section 10 provides the control appropriate to the target SOC in the passive control mode and simultaneously provides the control based on the advance scheduling of the driving method for the vehicle.

The HV control section 10 assumes its operation mode to be the autonomous control mode during a normal operation, for instance, after a vehicle engine is normally turned on. When receiving a signal for the target SOC from the navigation ECU 20, the HV control section 10 changes its operation mode to the passive control mode from the autonomous control mode. When receiving a notification to stop the scheduled driving (to be described) from the navigation ECU 20, the HV control section 10 changes its operation mode to the autonomous control mode from the passive control mode.

The GPS sensor 11, the direction sensor 12, and the vehicle speed sensor 13 are known sensors that are used to respectively detect a position, a driving direction, and a driving speed of the hybrid vehicle. The GPS sensor 11 outputs information indicating a vehicle position and information called Horizontal Dilution of Precision (HDOP). The HDOP is an example of precision information and represents horizontal precision degradation due to a distribution state of GPS satellites. The map DB storage section 14 is a storage medium for storing map data. The acceleration sensor 15 is a known sensor for detecting a vehicle acceleration. The vehicle speed sensor and the acceleration sensor are used to calculate an inclination or an inclined angle.

The map data contains node data corresponding to each of intersections and link data corresponding to each link, that is, a road path connecting intersections with each other. The node data contains, with respect to each node, an identification number, location information, and type information about the node. The link data contains, with respect to each link, an identification number (hereafter referred to as link ID), location information, and type information about the link.

The position information about the link contains location data of a shape supplementing point contained in the link and data about a segment connecting nodes at both ends of the link and connecting two adjacent shape supplementing points. Each segment data contains information such as a segment ID of the segment, an inclination, direction, and length of the segment.

Figure 2:
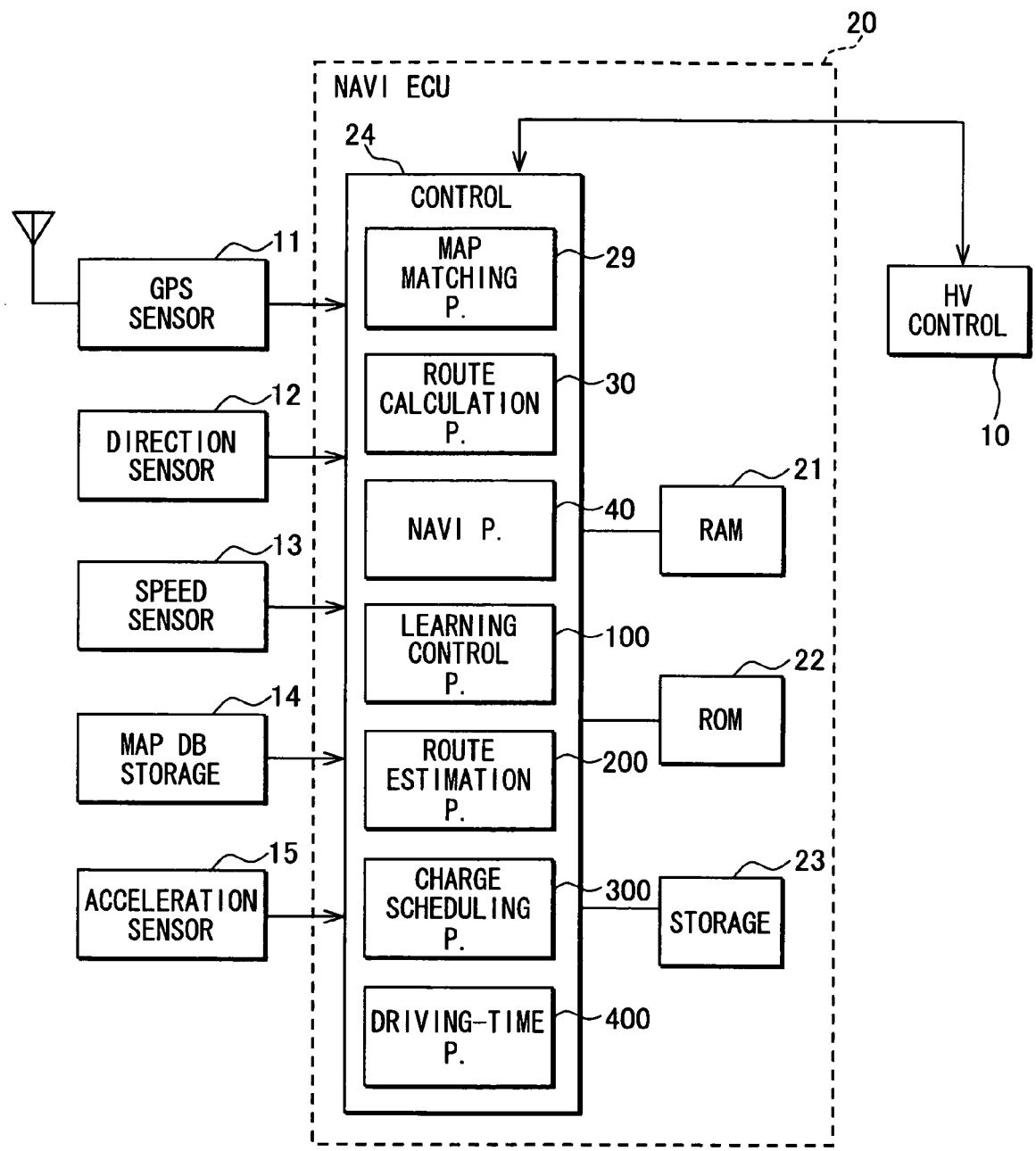
FIG. 2 is a block diagram showing a construction of a navigation ECU and a connection thereof with an outside.

As shown in FIG. 2, the navigation ECU 20 includes RAM 21, ROM 22, a durable storage medium 23 capable of writing data, and a control section 24. The durable storage medium can continuously maintain data even when a supply of main power to the navigation ECU 20 stops. The durable storage medium 23 represents, for example, a nonvolatile storage media such as a hard disk, flash memory, and EEPROM, and backup RAM.

The control section 24 performs a program read from the ROM 22 or the durable storage medium 23. At this time, the control section 24 reads information from the RAM 21, the ROM 22, and the durable storage medium 23. The control section 24 writes information to the RAM 21 and the durable storage medium 23. The control section 24 exchanges signals with the HV control section 10, the GPS sensor 11, the direction sensor 12, the vehicle speed sensor 13, the map DB storage section 14, and the acceleration sensor 15.

For instance, the control section 24 performs specified programs to implement a map matching process 29, a route calculation process 30, a navigation process 40, a learning control process 100, a route estimation process 200, a charge scheduling process 300, and a driving-time process 400.

In the map matching process 29, the control section 24 acquires information from the GPS sensor 11, the direction sensor 12, the vehicle speed sensor 13, and the acceleration sensor 15. Based on the acquired information, the control section 24 determines to which road in a map stored in the map DB storage section 14 the present position corresponds. In many cases, the map matching process 29 provides an inaccurate result when the subject vehicle starts driving. The map matching process 29 provides an accurate result after the vehicle travels a certain distance and enters a new segment.

In the route calculation process 30, the control section 24 uses map data to determine an optimal route to a specified destination based on the destination specification by a user. The user specifies the destination using an unshown operating device.

The route calculation process 30 settles a route to the destination. This route is hereafter referred to as a guidance route, an example of scheduled routes. In the navigation process 40, the control section 24 provides a driver with a guide display for driving the hybrid vehicle along the guidance route using an image display apparatus and a speaker (not shown).

Figure 3:
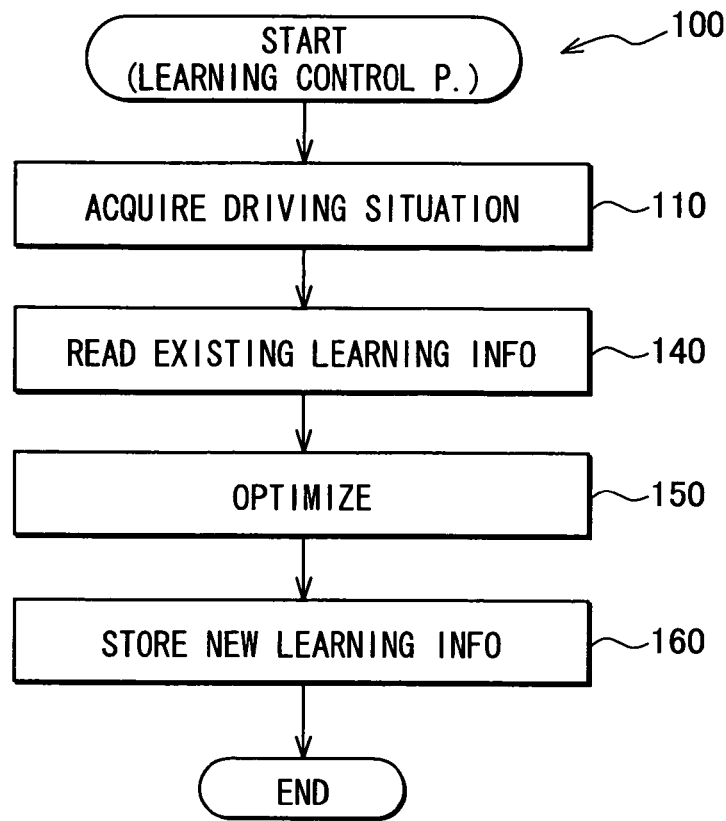
FIG. 3 is a flow chart showing a learning control process.

In the learning control process 100, the control section 24 records a road traveled by the hybrid vehicle and a history of driving situations on the road in the durable storage medium 23 on a (road) segment basis. Driving situations affect power consumption of the battery 9 while the vehicle runs on the road. FIG. 3 shows a flow chart of the learning control process 100. The process 100 assumes the same segment to be a different one when the driving direction differs.

The control section 24 repeatedly performs the learning control process 100 in FIG. 3. At Step 110 in each repetition, the control section 24 acquires information about the present driving situation. The driving situation provides information about either or both (i) external environment during driving and (ii) vehicle behavior during driving. The information acquired as the driving situation includes a link ID of a link for the present driving, a segment ID of a (road) segment for the present driving, a direction of the present vehicle, a present vehicle speed, a road inclination at the present position, a road type of the link, an electric power consumption for the segment, and an HDOP value output from the GPS sensor for the segment.

The control section 24 can specify the link ID and the segment ID by collating to each other (i) information about the present position from the GPS sensor 11 and (ii) information about the map data from the map DB storage section 14. The vehicle direction can be acquired from the direction sensor 12. The present vehicle speed can be acquired from the vehicle speed sensor 13. The control section 24 may calculate the road inclination using outputs from the vehicle speed sensor 13 and the acceleration sensor 15. The road type of the road is acquired from the map data. The control section 24 can calculate a travel distance in the link using outputs from the vehicle speed sensor 13.

At Step 140, the control section 24 reads existing learning information. For instance, the durable storage medium 23 may store history information about the driving situation corresponding to the segment ID acquired at Step 110. When this is the case, the control section 24 reads the information.

At Step 150, the control section 24 optimizes the segment information read at Step 140 and the driving situation information about the segment acquired at Step 110 in combination with each other. For the optimization, the control section 24 may calculate an average of the read information and the newly acquired information. When the driving situation history for the segment is unavailable at Step 140, the control section 24 proceeds to Step 150 and assumes the data acquired at Step 110 to be optimized data. The optimized driving situation data contains the segment ID; thereby, the data contains information about the road and the driving situation for the road associated with each other.

At Step 160, the control section 24 stores the optimized data as a new driving situation history about the segment, that is, learning information in the durable storage medium 23. After Step 160, one cycle of the learning control process 100 terminates.

Figure 4:
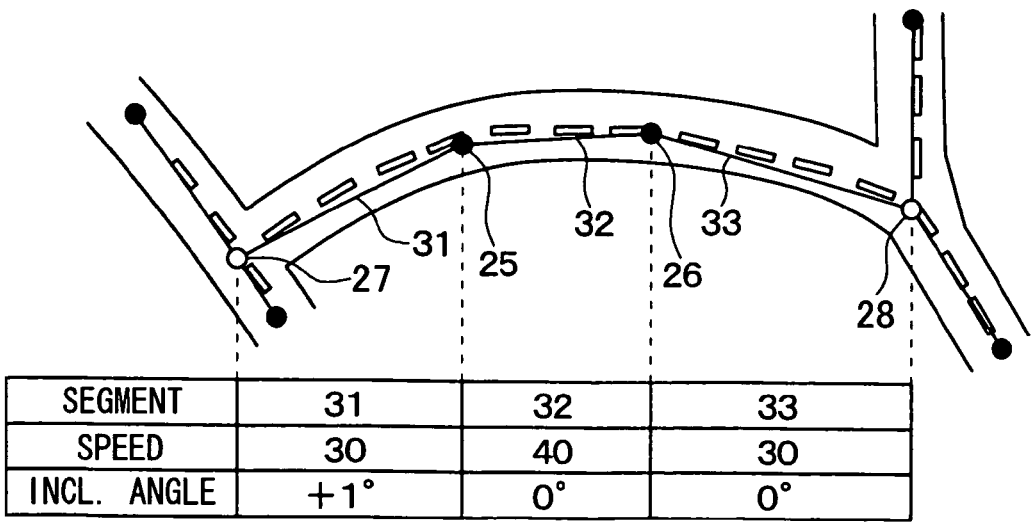
FIG. 4 shows an example of driving situation history for each segment.

When the learning control process 100 is performed, the durable storage medium 23 records the driving situation history about each of segments near a point capable of charging. FIG. 4 exemplifies a table of the driving situation history recorded in the durable storage medium 23 along with a road associated with the history.

Segments 31 through 33 are formed between a node 27, shape supplementary points 25 and 26, and a node 28. The driving situation history table shows vehicle speeds for driving the segments and road inclinations of the segments. These data affect power consumption and charge amount of the battery 9 while the vehicle runs through the segments. For example, an engine load increases as the road inclination becomes steep uphill and the vehicle speed increases. The assist driving at the segment increases the power consumption. As the road inclination becomes steep downhill, the regenerative charging at the segment generates a large charge amount.

At Step 160, the control section 24 allows the durable storage medium 23 to record information about a route traveled by the subject vehicle each time the vehicle travels. The information is hereafter referred to as route history and is recorded as part of the learning information. For instance, the information includes a date of the driving, a sequence of links traveled during the driving, and a destination as an end point of the driving. The control section 24 allows the durable storage medium 23 to record the information as learning data of a known Bayesian network model for each vehicle driving such as an interval of starting and stopping the engine.

Figure 5:
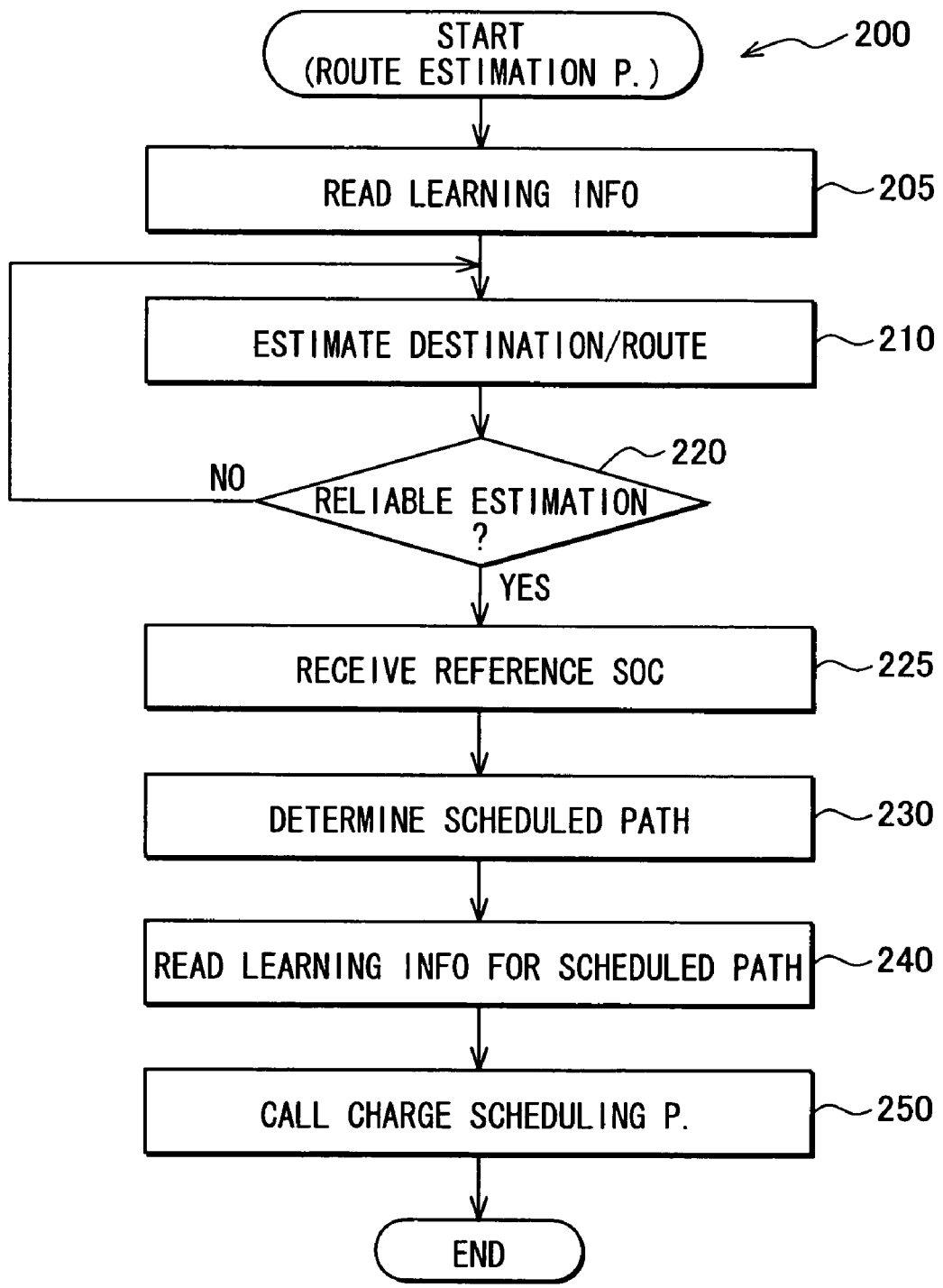
FIG. 5 is a flow chart showing a route estimation process.

FIG. 5 shows a flow chart of the route estimation process 200. When a user specifies no destination, the control section 24 performs the route estimation process 200 each time the vehicle engine turns on. When the user specifies no destination, the route estimation process 200 estimates a destination of the subject vehicle in the present driving and a route (hereafter referred to as an estimated route) to the destination based on the driving history in the learning information and the present driving situation of the subject vehicle.

At Step 205 of the route estimation process 200 during one cycle of execution, the control section 24 reads the route history in the learning information from the durable storage medium 23. At Step 210, the control section 24 estimates a destination of the subject vehicle for the present driving and a route expected to be traveled by the subject vehicle up to the destination. In the estimation, the control section 24 provides a Bayesian network model in the route history with a driving link sequence of the hybrid vehicle for the present driving. In this manner, the control section 24 can acquire the likelihood (equivalent to reliability) of each destination in the Bayesian network model. A destination having the highest likelihood is assumed to be estimated destination. The control section 24 performs a process equivalent to the route calculation process 30 on the estimated destination to determine an optimum route (hereafter referred to as an estimated route) from the present position to the estimated destination. Details about estimation of destinations and routes using Bayesian network models are already known (see JP-2007-10572 A for example).

At Step 220, the control section 24 determines whether or not the estimated destination and the estimated route are reliable. For instance, the control section 24 assumes the estimated destination and the estimated route to be reliable when the likelihood for the estimated destination at Step 210 is greater than or equal to a specified value. The control section 24 then proceeds to Step 225. Otherwise, the control section 24 assumes the estimated destination and the estimated route to be unreliable and returns to Step 210.

During driving of the subject vehicle, the control section 24 repeatedly computes the estimated destination and estimated route until the reliability for the estimation becomes greater than or equal to a specified value. In many cases, the reliability for the estimation at Step 210 improves with an increase in the travel distance for the present driving. The determination result at Step 220 becomes affirmative at a certain point of the driving, then control proceeds to Step 225. The control section 24 finds an estimated destination and an estimated route at Step 210 immediately before an affirmative determination results at Step 220. The estimated destination and the estimated route are hereafter referred to as a final estimated destination and a final estimated route (equivalent to examples of scheduled routes), respectively.

Figure 6:
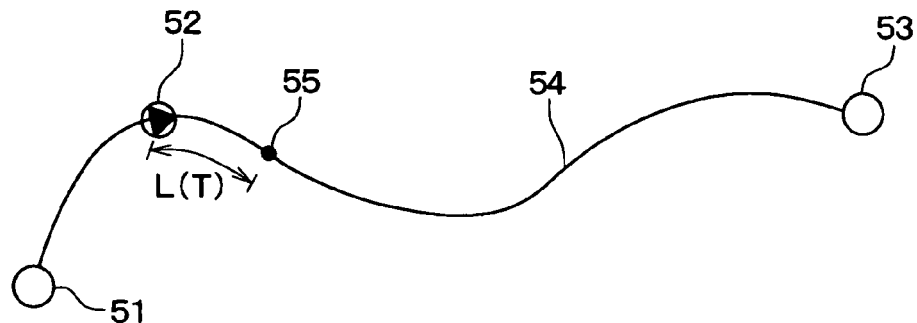
FIG. 6 is a route diagram showing relation between a present position of a subject vehicle and a start point of a scheduled path on a vehicle driving route.

FIG. 6 schematically shows a vehicle driving situation when an affirmative determination results at Step 220. According to the drawing, the route estimation process 200 starts when the subject vehicle starts running from a start point 51. The determination result at Step 220 becomes affirmative when the subject vehicle reaches a point 52. A final estimated destination 53 and a final estimated route 54 are determined. A distance between the start point 51 and the present position 52 signifies a travel distance of the hybrid vehicle and is equivalent to the time needed for the route estimation process 200 to reliably determine the estimated destination 53 and the estimated route 54.

At Step 225, the control section 24 requests the HV control section 10 for information about the reference SOC. The HV control section 10 transmits information about the reference SOC in response to the request. The control section 24 receives the information.

At Step 230, the control section 24 determines a scheduled path, which is targeted for the charge scheduling process 300. For instance, the control section 24 assumes the scheduled path from a given point (hereafter referred to as a path start point) to the final estimated destination along the final estimated route. In FIG. 6, a point 55 corresponds to the path start point. The scheduled path ranges from the point 55 to the final estimated destination 53 along the final estimated route 54.

The control section 24 calculates the position of the path start point 55 as a point the subject vehicle is expected to reach after time T (hereafter referred to as a reference time) from the present position 52. For example, the path start point 55 may be determined as a position (example of reference positions) from the present position 52 plus a distance L(T) found by multiplying the reference time T and a present speed of the subject vehicle together along the final estimated route 54. For example, an average vehicle speed at the present position 52 may be found from the learning information. The path start point 55 may be located from the present position 52 plus a distance L(T) found by multiplying the reference time T and the average vehicle speed together along the final estimated route 54.

The reference time T is a constant value preset during installation of the navigation ECU 20. The reference time T is longer than or equal to the time such as 10 seconds, 30 seconds, or one minute needed for executing the charge scheduling process 300. Accordingly, the path start point 55 is located when the subject hybrid vehicle advances from the present position 52 for the travel distance L(T) equivalent to be longer than or equal to the execution time T of the charge scheduling process 300.

At Step 240, the control section 24 reads learning information from the durable storage medium 23. The learning information is a history of driving situations for segments in the scheduled path determined at Step 230.

At Step 250, the control section 24 calls the charge scheduling process 300 based on the information acquired at Steps 225 and 240 so as to process the scheduled path determined at Step 230. The control section 24 thus starts the charge scheduling process 300 for the route immediately after fully reliably estimating the destination and the route to the destination.

Figure 7:
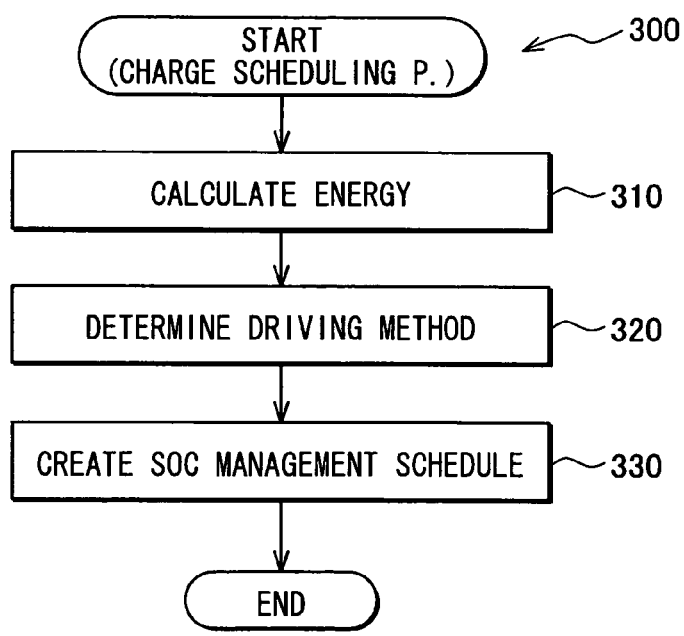
FIG. 7 is a flow chart showing a charge scheduling process.

FIG. 7 shows a flow chart of the charge scheduling process 300. The charge scheduling process 300 schedules a driving method for the vehicle as a charging plan within the scheduled path.

For instance, at Step 310, the control section 24 uses the learning information within the scheduled path to calculate an energy needed for driving through each of segments within the scheduled path. A method of calculating necessary energy is already known and a detailed description is omitted.

At Step 320, the control section 24 determines an optimum driving method for each segment up to the destination based on the learning information acquired at Step 240 and the information about the reference SOC acquired at Step 225. The reference SOC is used as an estimated value for the present SOC at the time when the subject vehicle reaches the scheduled path start point 55. The reason follows. The HV control section 10 operates in the autonomous control mode until the vehicle reaches the scheduled path start point 55. The present SOC is maintained approximately equal to the reference SOC.

Figure 8:
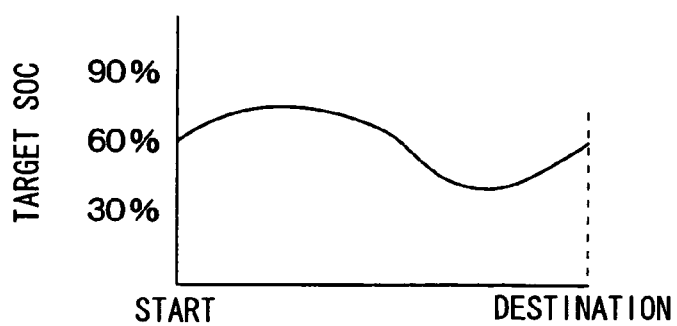
FIG. 8 is a graph showing transition of SOC changes estimated by the charge scheduling process.

At Step 330, the control section 24 creates an SOC management schedule based on the learning information. The SOC management schedule shows estimated SOC transition up to the destination. FIG. 8 shows a graph as an example of the estimated SOC transition. A value at each point of the estimated SOC transition is referred to as a target SOC. After Step 330, the control section 24 terminates one cycle of the charge scheduling process 300.

FIG. 9 shows a flow chart of the driving-time process 400. The control section 24 starts the driving-time process 400 when all of the following conditions are satisfied. The final estimated destination 53 and the final estimated route 54 to the final estimated destination 53 are determined. The charge scheduling process 300 are performed on the final estimated route 54. The hybrid vehicle is running on the final estimated route 54. The hybrid vehicle passes over the scheduled path start point.

At Step 452 of the driving-time process 400, the control section 24 reads the target SOC corresponding to the present position from the SOC management schedule and transmits the read target SOC to the HV control section 10. When receiving the target SOC, the HV control section 10 controls the driving method of the vehicle on the scheduled path so as to comply with the SOC management schedule derived from the driving method according to the charging schedule. As a result, the HV control section 10 can control the driving method of the vehicle in accordance with the charging schedule in many cases and reduce the fuel consumption. At Step 454, the control section 24 receives the present SOC from the HV control section 10.

At Step 455, the control section 24 performs an exception process. In the exception process, the control section 24 determines the need for changing the charging schedule. When the need arises, the control section 24 re-executes the charge scheduling process 300. The need for changing the charging schedule is determined based on a criterion whether or not a difference between the present SOC and the target SOC is greater than or equal to the reference value, for example.

Before re-executing the charge scheduling process 300, the control section 24 re-executes Step 230 of the route estimation process 200 to determine a new scheduled path start point. The control section 24 allows a scheduled path between the scheduled path start point and the final estimated destination to be processed by the charge scheduling process 300.

At Step 460, the control section 24 checks a signal from the GPS sensor 11 to determine whether or not the hybrid vehicle reaches the final estimated destination 53. The control section 24 repeats Steps 452 through 460 until the hybrid vehicle reaches the final estimated destination 53. When the hybrid vehicle reaches the final estimated destination 53, the control section 24 terminates the driving-time process 400.

Thus, even though the user specifies no destination, the navigation ECU 20 automatically estimates a destination and a route to the destination based on the past route history. The charge scheduling process is performed on the estimated route. The battery can be charged and discharged as scheduled for driving along a frequented route with no destination specified by the user such as a route between the home and the office of the user. As a result, the fuel consumption for the route is reduced.

After the final estimated route is specified, the navigation ECU 20 determines a start point of the scheduled path from the present position of the hybrid vehicle spaced by the reference distance therebetween along the estimated route. According to the embodiment, the reference distance corresponds to a travel distance of the hybrid vehicle equivalent to the reference time T needed to determine a schedule and start and finish estimating transition of the remaining battery quantity.

From another viewpoint, the navigation ECU 20 determines a start point of the scheduled path along the final estimated route spaced by the intervening reference distance from the hybrid vehicle position corresponding to a time point to start determining a schedule and estimating transition of the remaining battery quantity, that is, a time point to start the charge scheduling process 300. Using the start point, the navigation ECU 20 determines a schedule and estimates transition of the remaining battery quantity.

When the hybrid vehicle runs on the route and enters the scheduled path, the navigation ECU 20 starts the charge-discharge control in accordance with the above-mentioned schedule and continues the control on the scheduled path.

The start point of the scheduled path targeted for the scheduled charge-discharge control is positioned at the intervening reference distance from the hybrid vehicle position where the final estimated route is specified (i.e., from the position where the hybrid vehicle is located when the final estimated route is specified). The hybrid vehicle does not pass over the start point for the scheduled charge-discharge control until the determination of the schedule and the estimation of the remaining battery quantity are complete. There is no difference between the start point for the actual charge-discharge control and the start point for the scheduled charge-discharge control. As a result, it is possible to decrease an adverse effect on the scheduled charge-discharge control due to the time consumed for the scheduling.

The navigation ECU 20 determines the schedule on the scheduled path on the assumption that the remaining battery quantity at the scheduled path start point is equivalent to the reference SOC (see Step 225). When the HV control section 10 operates in the autonomous control mode, the remaining battery quantity is maintained in the reference SOC before the vehicle enters the scheduled path. This process determines the remaining battery quantity at the start point of the scheduled path and decreases a difference between the scheduled remaining battery quantity and the actual remaining battery quantity at the start point of the charge-discharge control. As a result, it is possible to further decrease an adverse effect on the scheduled charge-discharge control due to the time consumed for the scheduling.

Second Embodiment

The following describes a second embodiment of the present invention. The second embodiment differs from the first embodiment in that the control section 24 of the navigation ECU 20 according to the second embodiment estimates a distance (equivalent to an MM distance) for allowing the map matching process 29 to provide an accurate result and reflects the estimation on the determination of the start point on the scheduled path.

Figure 10:
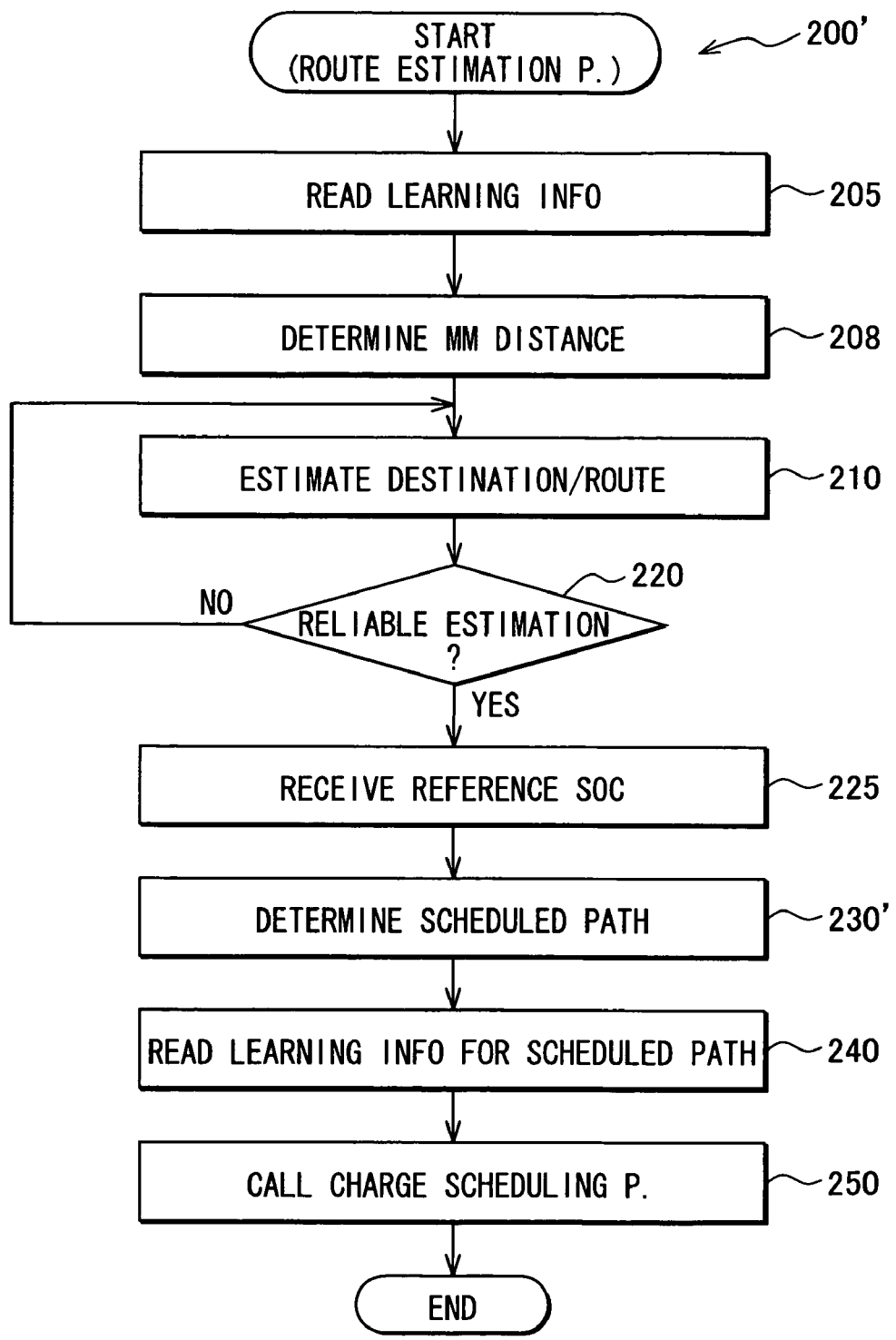
FIG. 10 is a flow chart of a route estimation process performed by a control section according to a second embodiment of the present invention.

Because of this operation, the control section 24 according to the second embodiment executes a route estimation process 200' in FIG. 10 instead of the route estimation process 200 in FIG. 5. The steps designated by the same reference numerals in FIGS. 5 and 10 provide the same processes and a detailed description is omitted for simplicity.

In the route estimation process 200', the control section 24 performs Steps 205, 208, and then 210 in order.

At Step 208, the control section 24 determines an estimated MM distance. When the subject vehicle starts running from the present position, the subject vehicle is expected to travel the estimated MM distance until the map matching process 29 provides an accurate result. To calculate the MM distance, the control section 24 executes a program 500 in FIG. 11.

At Step 510 of the program 500, the control section 24 determines whether or not the subject vehicle is situated on a road. For example, the control section 24 determines whether or not position information acquired from the GPS sensor 11 is included in any range of roads recorded in the map DB storage section 14. When the subject vehicle is determined to be situated on a road, the control section 24 proceeds to Step 520. Otherwise, the control section 24 proceeds to Step 525.

At Step 520, the control section 24 determines the estimated MM distance equivalent to a distance between the present position and the start point of the segment the subject vehicle enters next. The control section 24 then terminates the program 500. The segment the subject vehicle enters next is located in the running direction of the subject vehicle and is contiguous to the segment where the subject vehicle is presently situated.

The start point of the segment the subject vehicle enters next forms a boundary between the segment presently containing the subject vehicle and the segment the subject vehicle enters next.

At Step 525, the control section 24 determines whether or not the HDOP output from the GPS sensor 11 is smaller than a reference value such as 2.5. When the GPS sensor 11 is smaller than the reference value, the control section 24 proceeds to Step 530. In this case, the position information is more accurate than the reference. When the GPS sensor 11 is not smaller than the reference value, the control section 24 proceeds to Step 540. In this case, the position information is less accurate than the reference.

At Step 530, the control section 24 finds an estimated MM distance by adding a first distance such as 100 meters to a remaining distance up to the starting point of the immediately subsequent segment. The control section 24 then terminates the program 500. The remaining distance up to the starting point of the immediately subsequent segment denotes a distance between (i) a position at the first distance traveled by the subject vehicle from the present position and (ii) the start point of the next segment along the final estimated route. The final estimated route is determined at Steps 210 and 220 later. An actual value for the remaining distance is determined at Step 230' later.

At Step 540, the control section 24 finds an estimated MM distance by adding a second distance, which is such as 150 meters longer than the first distance, to a remaining distance to the start point of the immediately subsequent segment. The control section 24 then terminates the program 500. The remaining distance to the start point of the immediately subsequent segment denotes a distance between (i) a position at the second distance traveled by the subject vehicle from the present position and (ii) the start point of the next segment along the final estimated route. An actual value for this remaining distance is also determined at Step 230' later.

Subsequent to Step S225 after the final estimated route is determined at Step 220, the control section 24 performs Steps 230' and then 240. At Step 230', the control section 24 determines a scheduled path on the final estimated route. Similarly to the first embodiment, the end point of the scheduled path equals the final destination.

Figure 12:
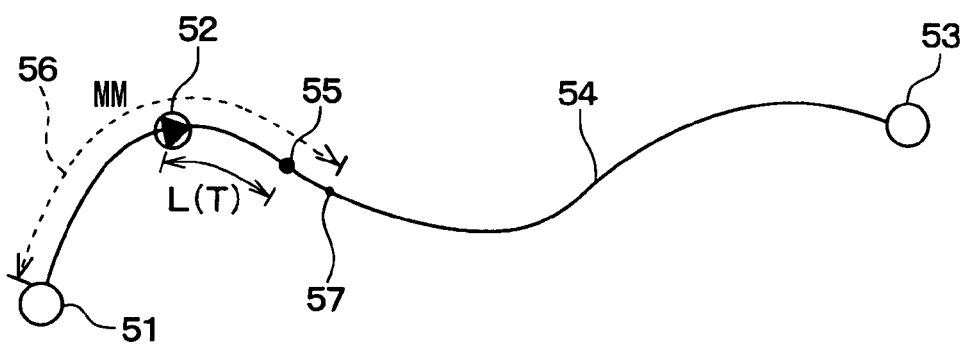
FIG. 12 shows relation between an estimated MM distance (MM) and a distance L(T)
Figure 13:
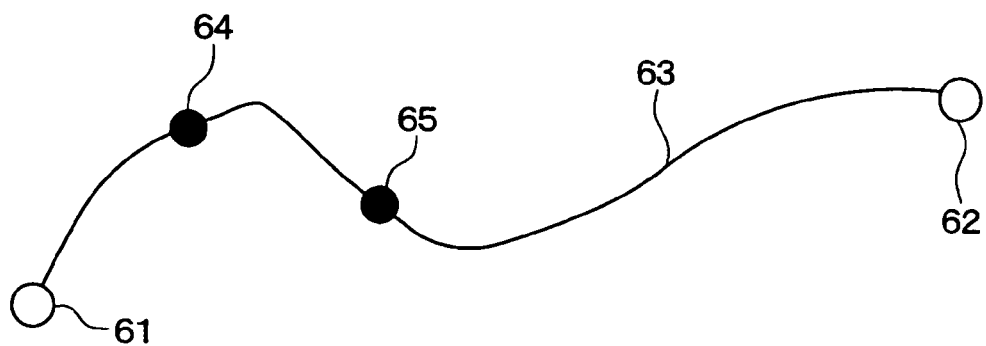
FIG. 13 exemplifies a problem resulting from scheduled control according to related art.

However, the method of determining the start point of the scheduled path differs from the first embodiment. The determination method will be described below with reference to FIG. 12. Similarly to the first embodiment, the control section 24 specifies a position 55 at a distance L(T) from the present position 52 on the final estimated route 54. The distance L(T) is found by multiplying the reference time T and a present subject vehicle speed together. The control section 24 further specifies an estimated MM point 57 at the MM distance 56 from the start point 51 along the final estimated route 54. The start point 51 is equivalent to the time point the program 500 is executed. The control section 24 determines the scheduled path start point using the position 55 or 57 whichever precedes or approximates to the final estimated destination 53.

As mentioned above, the navigation ECU 20 determines the estimated MM distance after the hybrid vehicle starts running until the map matching process 29 provides an accurate result. The start point of the scheduled path is equivalent to the reference position and is settled beyond the MM distance 56 from the start point of the estimated route along the final estimated route 54.

The hybrid vehicle may be inaccurately located while the map matching process 29 provides an inaccurate result. When the scheduled path start point is determined where the map matching process 29 is assumed to be inaccurate, the scheduled charge-discharge control may not start even though the hybrid vehicle actually reaches the start point. In such case, the subject vehicle has already passed over the reference position even though the charge-discharge control starts as scheduled in accordance with the correct map matching. The charge-discharge control may not be provided as scheduled.

The embodiment specifies the estimated MM distance as mentioned above and does not provide a start point for the scheduled charge-discharge control within the range of the estimated MM distance. In this manner, it is possible to prevent an inaccurate charge-discharge control due to an inaccurate result from the map matching process 29.

In the map matching process 29, the navigation ECU 20 uses the position information from the GPS sensor 11 mounted on the hybrid vehicle to determine which road the hybrid vehicle is traveling. The navigation ECU 20 determines a short estimated MM distance corresponding to the highly accurate position information based on the precision information indicating the position information precision (see Steps 525, 530, and 540). The navigation ECU 20 generates the estimated MM distance using precision of the map matching process 29 at a position where the estimated MM distance is to be determined. The precision of the estimated MM distance improves.

The navigation ECU 20 causes the estimated MM distance to be longer when the hybrid vehicle is not found on the road than when the hybrid vehicle is found on the road. The map matching becomes accurate faster when the subject vehicle already exists on the road than otherwise. In this manner, the accuracy of the estimated MM distance improves.

In the above-mentioned embodiments, the navigation ECU 20 is equivalent to an example of the charge-discharge control apparatus. The control section 24 functions as an example of a learning means or a learning control unit by executing the learning control process 100. The control section 24 functions as an example of an estimated route specification means or an estimated route specification control unit by executing Steps 205, 210, and 220 of the route estimation process 200. The control section 24 functions as an example of a scheduled running means or a scheduled running control unit by executing the driving-time process 400. The control section 24 functions as an example of a start point determination means or a start point determination control unit by executing Step 230 of the route estimation process 200 or 200'.

In the second embodiment, the control section 24 functions as an example of a map matching means or a map matching control unit by executing the map matching process 29. The control section 24 functions as an example of an MM distance estimation means or an MM distance estimation control unit by executing Step 280 of the route estimation process 200'. The control section 24 functions as an example of an accuracy history recording means or an accuracy history recording control unit by recording an HDOP value in the learning control process 100.

Other Embodiments

While there have been described specific preferred embodiments of the present invention, it is to be distinctly understood that the present invention is not limited thereto and includes various modes capable of embodying functions of specifics of the invention.

At Step 230' of the second embodiment, for example, the control section 24 may discard the estimated MM distance determined at Step 208 and determine a new estimated MM distance based on the learning information. The new estimated MM distance is assumed to range from a start point of the final estimated route to an HDOP point along the final estimated route. In this case, the HDOP point is compared to the point 55 in FIG. 12.

The learning control process 100 records past HDOP values for each segment. The values are used to determine the HDOP point. For instance, the control section 24 sequentially traces segments on the final estimated route from the start point of the final estimated route. The control section 24 reads past HDOP values for each segment from the learning information. The HDOP point is assumed to be the start point of a segment corresponding to the first HDOP value that exceeds a reference accuracy such as 2.0. The start point of the segment is equivalent to an end point proximate to the start point of the final estimated route.

In this manner, the accuracy of the estimated MM distance improves by estimating a point for accurate map matching using the past precision information.

In the above-mentioned embodiments, the control section 24 performs the route estimation process 200 or 200' to determine the final estimated destination and the final estimated route and then the scheduled path immediately thereafter, and performs the charge scheduling process on the scheduled path.

In addition, immediately after the route calculation process 30, the control section 24 may perform Steps 225 through 250 of the route estimation process 200 on the calculated guidance route to determine a scheduled path on the guidance route and perform the charge scheduling process on the scheduled path.

Immediately after the route calculation process 30, the control section 24 may perform Steps 205 and 208 of the route estimation process 200' and perform Steps 225 through 250 on the calculated guidance route. In this manner, it may be preferable to determine a scheduled path on the guidance route and perform the charge scheduling process on the scheduled path.

In these cases, the start point of the scheduled path is located at a distance equivalent to the above-mentioned reference time T from the present position of the subject vehicle immediately after the route calculation process 30 along the guidance route.

When the hybrid vehicle indicates the running speed of zero at the termination of the route calculation process 30, the control section 24 may specify an average vehicle speed at the present position from the learning information. The control section 24 may multiply the average vehicle speed by the reference time T to find the travel distance of the hybrid vehicle equivalent to the reference time T from the present position along the guidance route. In this case, the control section 24 functions as an example of an estimated route specification means or an estimated route specification control unit by executing the route calculation process 30.

At Step 230 of the route estimation process 200 in the first embodiment, the control section 24 specifies the scheduled path between the path start point and the final estimated destination along the final estimated route. The end point of the scheduled path need not correspond to the final estimated destination. When the end point is specified somewhere between the path start point and the final estimated destination, the fuel economy increases at least between the path start point and the end point.

The reference time T used for the Step 230 or 230' need not be a constant value but may be a value that increases with an increase of the distance between the present position and the end point of the scheduled path. This is because the charge scheduling process 300 may require a long time to be completed as the path to be processed is extended.

The above-mentioned embodiments use a road segment as a unit of calculating the power consumption and the charge amount and creating the charge schedule. A segment may be replaced by a (road) link.

Step 230 of the route estimation process 200 or Step 230' of the route estimation process 200' uses the reference time T that must not be zero for realization of the first and second features of the invention. The reference time T may be shorter than the time required to start and finish estimating transition of the remaining battery quantity. The hybrid vehicle may pass over the start point of the scheduled charge-discharge control because the reference time T is shorter than the time required to finish estimating transition of the remaining battery quantity. When the reference time T is longer than zero, the passed distance decreases. This decreases a difference between the start point of the actual charge-discharge control and the start point of the scheduled charge-discharge control. As a result, it is possible to decrease an adverse effect on the scheduled charge-discharge control due to the time consumed for the scheduling.

The battery can be charged and discharged as scheduled during driving along a frequented route with no destination specified by the user such as a route between the home and the office of the user. As a result, the fuel consumption for the route is reduced. When only this effect needs to be achieved, the reference time T may be zero.

According to the above-mentioned embodiments, the navigation ECU 20 performs the charge scheduling process 300 and the driving-time process 400. The navigation ECU 20 may perform all of these processes. The navigation ECU 20 may perform part of the processes and the HV control section 10 may perform the remainder.

According to the embodiments, the control section 24 performs the programs to implement the functions. The functions may be replaced by a hardware device having the equivalent functions. Such an example of a hardware device includes an FPGA capable of programming the circuit construction.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As a first aspect of the disclosure, a charge-discharge management apparatus for a battery of a hybrid vehicle is provided. Herein the hybrid vehicle uses an internal combustion engine driven by fuel combustion and a motor driven by the battery as a power source for running. The charge-discharge management apparatus includes the following. An estimated route specification control unit is configured to specify an estimated route expected to be traveled by the hybrid vehicle. A scheduling control unit is configured to, after the estimated route is specified, (i) determine a schedule about whether or not to drive the hybrid vehicle using the motor and to charge the battery on a scheduled path along the estimated route and (ii) estimate transition of a remaining quantity of the battery along the estimated route based on the schedule. A scheduled running control unit is configured, when the hybrid vehicle runs on the estimated route and enters the scheduled path, to (i) start a control over whether or not to drive the hybrid vehicle using the motor and to control charging of the battery in accordance with the schedule and (ii) continue the control on the scheduled path. A start point determination control unit is configured to, after the estimated route is specified, determine a start point of the scheduled path, the start point being assumed to be a reference position at a reference distance from a present position of the hybrid vehicle along the estimated route.

According to the first aspect, the charge-discharge control apparatus determines, of the scheduled path, a start point, which is assumed to be a reference position at a reference distance traveled by the hybrid vehicle from a present position along the estimated route after the estimated route is specified.

Thus, the start point of the scheduled path targeted for the scheduled charge-discharge control is at least positioned at the intervening reference distance from the hybrid vehicle position when the final estimated route is specified. The hybrid vehicle therefore less possibly passes over the start point for the scheduled charge-discharge control until the determination of the schedule and the estimation of the remaining battery quantity are complete. Even when the hybrid vehicle passes over the start point, the passed distance decreases.

The result is to decrease a difference between the start point of the actual charge-discharge control and the start point of the scheduled charge-discharge control. As a result, it is possible to decrease an adverse effect on the scheduled charge-discharge control due to the time consumed for the scheduling.

The charge-discharge control apparatus may include a learning control unit configured to record a history of a route traveled by the hybrid vehicle. In this case, the charge-discharge control apparatus may determine a destination expected to be targeted by the hybrid vehicle based on the recorded history and specify the scheduled route as a route expected to be traveled by the hybrid vehicle toward the destination.

Thus, even though the user specifies no destination, the charge-discharge control apparatus estimates a destination and a route to the destination based on the past route history and creates a schedule for the estimated route. The battery can be charged and discharged as scheduled for driving along a frequented route with no destination specified by the user such as a route between the home and the office of the user. As a result, the fuel consumption for the route is reduced.

Further, the charge-discharge control apparatus may control a hybrid control apparatus that changes an operation mode thereof between an autonomous control mode and a passive control mode based on control from the scheduled running control unit. The autonomous control mode keeps a remaining quantity of the battery equal to a reference remaining quantity by selecting whether or not to drive the hybrid vehicle using the motor and to charge the battery independently of control from the charge-discharge management apparatus. The passive control mode selects whether or not to drive the hybrid vehicle using the motor and to charge the battery in accordance with control based on the schedule from the charge-discharge control apparatus.

The charge-discharge control apparatus may change an operation mode of a hybrid control section from the autonomous control mode to the passive control mode at the start point of the scheduled path when the hybrid vehicle runs on the estimated route.

In this case, the charge-discharge control apparatus may determine the schedule on the scheduled path assuming that a remaining quantity of the battery equals the reference remaining quantity at the start point of the scheduled path. When the hybrid control apparatus operates in the autonomous control mode, the remaining battery quantity is maintained in the reference remaining quantity before the vehicle enters the scheduled path. The operation is used to determine the remaining battery quantity at the start point of the scheduled path and decrease a difference between the scheduled remaining battery quantity and the actual remaining battery quantity at the start point of the charge-discharge control. As a result, it is possible to decrease an adverse effect on the scheduled charge-discharge control due to the time consumed for the scheduling.

As a second aspect of the discloser, a charge-discharge management apparatus for a battery of a hybrid vehicle is provided. The hybrid vehicle uses an internal combustion engine driven by fuel combustion and a motor driven by the battery as a power source for running. The charge-discharge management apparatus includes the following. An estimated route specification control unit is configured to specify an estimated route expected to be traveled by the hybrid vehicle. A scheduling control unit is configured to (i) determine a schedule about whether or not to drive the hybrid vehicle using the motor and to charge the battery on a scheduled path along the estimated route and (ii) estimate transition of a remaining quantity of the battery along the estimated route based on the determined schedule. A scheduled running control unit is configured, when the hybrid vehicle runs on the estimated route and enters the scheduled path, to (i) start a control over whether or not to drive the hybrid vehicle using the motor and to control charging of the battery in accordance with the schedule and (ii) continue the control on the scheduled path. Herein, the scheduling control unit is configured to determine the schedule and estimate the transition of the remaining quantity by assuming a reference position to be a start point of the scheduled path, the reference position being located at a reference distance along the estimated route from a position where the hybrid vehicle is located when the scheduling control unit starts determining the schedule and estimating the transition of the remaining quantity of the battery.

The start point of the scheduled path targeted for the scheduled charge-discharge control is at least positioned at the intervening reference distance from the start position for starting of determining a schedule and estimating the transition of the remaining battery quantity. The hybrid vehicle less possibly passes over the start point for the scheduled charge-discharge control until the determination of the schedule and the estimation of the remaining battery quantity are complete. When the hybrid vehicle passes over the start point, the passed distance decreases.

The result is to decrease a difference between the start point of the actual charge-discharge control and the start point of the scheduled charge-discharge control. As a result, it is possible to decrease an adverse effect on the scheduled charge-discharge control due to the time consumed for the scheduling.

According to the first and second aspects, the charge-discharge control apparatus may include a map matching control unit configured to determine which road the hybrid vehicle is running and a map-matching distance estimation control unit configured to estimate a map-matching travel distance, which is a travel distance measured after the hybrid vehicle starts running until the map matching control unit provides an accurate determination. Herein the reference position is located ahead of a position at the map-matching distance from the start point of the estimated route along the estimated route.

The hybrid vehicle may be inaccurately located while a map matching process is inaccurate. When the start point for the scheduled charge-discharge control or the reference position is determined where the map matching process is assumed to be inaccurate, the scheduled charge-discharge control may not start even though the hybrid vehicle actually reaches the reference position. In such case, the subject vehicle has already passed over the reference position while the charge-discharge control starts as scheduled in accordance with the incorrect map matching. The charge-discharge control may not be provided appropriately as scheduled.

To solve this problem, the charge-discharge control apparatus may estimate a travel distance (hereafter referred to as an MM distance) measured after the hybrid vehicle starts running until the map matching is accurate. The reference position may be located ahead of a position at the MM distance from a start point of the estimated route along the estimated route.

In this manner, the MM distance is estimated and no start point is provided for the scheduled charge-discharge control within the range of the estimated MM distance. In this manner, it is possible to prevent an inaccurate charge-discharge control due to an inaccurate result from the map matching.

In the map matching, the charge-discharge control apparatus may use the position information from the GPS sensor mounted in the hybrid vehicle to determine which road the hybrid vehicle is traveling. In this case, the charge-discharge control apparatus may determine a short MM distance corresponding to the highly accurate position information based on the precision information indicating the position information precision. The charge-discharge control apparatus estimates an MM distance using the map matching precision at a position where the estimated MM distance is to be estimated. Consequently, the estimation precision improves.

The charge-discharge control apparatus may use position information from a GPS sensor mounted in the hybrid vehicle to determine on which road the hybrid vehicle is running. The charge-discharge control apparatus may include an accuracy history recording control unit configured to record precision information equivalent to precision of position information received from the GPS sensor at each of positions traveled by the hybrid vehicle. The reference position may be one of the positions for recording the precision information and first becomes more accurate than a reference accuracy.

In this manner, the accuracy of the MM distance improves by estimating a point for accurate map matching using the past precision information.

The charge-discharge control apparatus may cause the MM distance to be longer when the hybrid vehicle is not found on the road than when the hybrid vehicle is found on the road. The map matching becomes accurate faster when the subject vehicle already exists on the road than otherwise. In this manner, the accuracy of the MM distance estimation improves.

In the first and second aspects, the reference distance may be a travel distance of a hybrid vehicle on the assumption that the travel distance is equivalent to a reference time required to start and finish determining the schedule and estimating transition of a remaining quantity of the battery. In this manner, the hybrid vehicle does not pass over the start point for the scheduled charge-discharge control until the determination of the schedule and the estimation of the remaining battery quantity are complete.

Each of the first and second aspects of the apparatuses can be achieved as a method or a computer readable medium having instructions including the method for achieving the elements or functions of the apparatuses.

It will be obvious to those skilled in the art that various changes may be made in the above-described embodiments of the present invention. However, the scope of the present invention should be determined by the following claims.

What is claimed is:

1. A charge-discharge management apparatus for a battery of a hybrid vehicle, which uses an internal combustion engine driven by fuel combustion and a motor driven by the battery as a power source for running, the apparatus comprising:
   an estimated route specification control unit configured to specify an estimated route expected to be traveled by the hybrid vehicle;
   a scheduling control unit configured to, after the estimated route is specified, (i) determine a schedule of a scheduled path along the estimated route about whether or not to drive the hybrid vehicle using the motor and to charge the battery and (ii) estimate transition of a remaining quantity of the battery along the estimated route based on the schedule of the scheduled path;
   a scheduled running control unit configured, when the hybrid vehicle runs on the estimated route and enters the scheduled path, to (i) start a control over whether or not to drive the hybrid vehicle using the motor and to control charging of the battery in accordance with the schedule and (ii) continue the control on the scheduled path; and
   a map-matching control unit configured to determine which road the hybrid vehicle is running on using position information from a GPS sensor provided in the hybrid vehicle;
   a map-matching distance estimation control unit configured to estimate a map-matching distance, which is a distance traveled after the hybrid vehicle starts running until the map matching control unit provides an accurate determination of which road the hybrid vehicle is running on so as to shorten the map-matching distance in proportion to an increase of precision of the position information, based on precision information indicating precision of the position information; and
   a start point determination control unit configured to, after the estimated route is specified, determine a reference position as a start point of the scheduled path whose schedule is determined by the scheduling control unit,
   the reference position being located along the estimated route ahead of a position that is reached by the hybrid vehicle by traveling the map-matching distance after the hybrid vehicle starts running.

2. The charge-discharge control apparatus according to claim 1, further comprising:
   a learning control unit configured to record a history of a route traveled by the hybrid vehicle,
   wherein the estimated route specification control unit specifies a destination expected to be targeted by the hybrid vehicle based on the recorded history and specifies the estimated route as a route expected to be traveled by the hybrid vehicle toward the destination.

3. The charge-discharge management apparatus according to claim 1,
   wherein the scheduled running control unit is configured to control a hybrid control apparatus that changes an operation mode thereof between an autonomous control mode and a passive control mode based on control from the scheduled running control unit, the autonomous control mode being for keeping a remaining quantity of the battery equal to a reference remaining quantity by selecting whether or not to drive the hybrid vehicle using the motor and to charge the battery independently of control from the scheduled running control unit, the passive control mode being for selecting whether or not to drive the hybrid vehicle using the motor and to charge the battery in accordance with control based on the schedule from the scheduled running control unit;
   wherein the scheduled running control unit is configured to change an operation mode of the hybrid control apparatus from the autonomous control mode to the passive control mode at the start point of the scheduled path when the hybrid vehicle runs on the estimated route; and
   wherein the scheduling control unit is configured to determine the schedule of the scheduled path assuming that a remaining quantity of the battery equals the reference remaining quantity at the start point of the scheduled path.

4. The charge-discharge management apparatus according to claim 1,
   wherein the map-matching distance estimation control unit causes the estimated map-matching distance to be longer when the hybrid vehicle is not found on the road than when the hybrid vehicle is found on the road.

5. A computer readable medium comprising instructions being executed by a computer, the instructions including a computer-implemented method for managing a battery of a hybrid vehicle, which uses an internal combustion engine driven by fuel combustion and a motor driven by the battery as a power source for running, the instructions comprising:
   performing map-matching to determine a road the hybrid vehicle is running on using position information from a GPS sensor provided in the hybrid vehicle;
   estimating a map-matching distance, which is a distance traveled after the hybrid vehicle starts running until the map-matching provides an accurate determination of which road the hybrid vehicle is running on so as to shorten the map-matching distance in proportion to an increase of precision of the position information based on precision information indicating precision of the positional information;

specifying an estimated route expected to be traveled by the hybrid vehicle;

determining, after the estimated route is specified, a reference position as a start point of the scheduled path, the reference position being located along the estimated route ahead of a position that is reached by the hybrid vehicle by traveling the map-matching distance after the hybrid vehicle starts running;

determining a schedule about whether or not to drive the hybrid vehicle using the motor and to charge the battery, the schedule of the scheduled path starting from the determined start point along the estimated route while estimating transition of a remaining quantity of the battery along the estimated route based on the schedule; and starting, when the hybrid vehicle runs on the estimated route and enters the scheduled path starting from the start point, a control over whether or not to drive the hybrid vehicle using the motor and to control charging of the battery in accordance with the determined schedule and continuing the control on the scheduled path.

6. A charge-discharge management apparatus for a battery of a hybrid vehicle, which uses an internal combustion engine driven by fuel combustion and a motor driven by the battery as a power source for running, the apparatus comprising:

an estimated route specification control unit configured to specify an estimated route expected to be traveled by the hybrid vehicle;

a scheduling control unit configured to, after the estimated route is specified, (i) determine a schedule of a scheduled path along the estimated route about whether or not to drive the hybrid vehicle using the motor and to charge the battery and (ii) estimate transition of a remaining quantity of the battery along the estimated route based on the schedule of the scheduled path;

a scheduled running control unit configured, when the hybrid vehicle runs on the estimated route and enters the scheduled path, to (i) start a control over whether or not to drive the hybrid vehicle using the motor and to control charging of the battery in accordance with the schedule and (ii) continue the control on the scheduled path;

a map-matching control unit configured to determine which road the hybrid vehicle is running on using position information from a GPS sensor provided in the hybrid vehicle;

an accuracy history recording control unit configured to record precision information equivalent to precision of position information received from the GPS sensor at each of a plurality of positions traveled by the hybrid vehicle after the hybrid vehicle starts running; and a start point determination control unit configured to, after the estimated route is specified, determine a reference position along the estimated route as a start point of the scheduled path whose schedule is determined by the scheduling control unit, the reference position being a first position that is one of the plurality of positions for recording the precision information recorded by the accuracy history recording control unit, the first position being the first from among the plurality or positions along the estimated route having an accuracy greater than a reference accuracy.

7. The charge-discharge control apparatus according to claim 6, further comprising:

a learning control unit configured to record a history of a route traveled by the hybrid vehicle, wherein the estimated route specification control unit specifies a destination expected to be targeted by the hybrid vehicle based on the recorded history and specifies the estimated route as a route expected to be traveled by the hybrid vehicle toward destination.

8. The charge-discharge management apparatus according to claim 6, wherein the scheduled running control unit is configured to control a hybrid control apparatus that changes an operation mode thereof between an autonomous control mode and a passive control mode based on control from the scheduled running control unit, the autonomous control mode being for keeping a remaining quantity of the battery equal to a reference remaining quantity by selecting whether or not to drive the hybrid vehicle using the motor and to charge the battery independently of control from the scheduled running control unit, the passive control mode being for selecting whether or not to drive the hybrid vehicle using the motor and to charge the battery in accordance with control based on the schedule from the scheduled running control unit;

wherein the scheduled running control unit is configured to change an operation mode of the hybrid control apparatus from the autonomous control mode to the passive control mode at the start point of the scheduled path when the hybrid vehicle runs on the estimated route; and wherein the scheduling control unit is configured to determine the schedule of the scheduled path, assuming that a remaining quantity of the battery equals the reference remaining quantity at the start point of the scheduled path.

9. A computer readable medium comprising instructions being executed by a computer, the instructions including a computer-implemented method for managing a battery of a hybrid vehicle, which uses an internal combustion engine driven by fuel combustion and a motor driven by the battery as a power source for running, the instructions comprising:

performing a map-matching to determine a road the hybrid vehicle is running, using position information from a GPS sensor provided in the hybrid vehicle;

recording precision information equivalent to precision of position information received from the GPS sensor at each of a plurality of positions traveled by the hybrid vehicle after the hybrid vehicle starts running;

specifying an estimated route expected to be traveled by the hybrid vehicle;

determining, after the estimated route is specified, a reference position along the estimated route as a start point of the scheduled path, the reference position being a first position that is one of the plurality of positions for recording the precision information, the first position becoming more accurate than a reference accuracy first among the plurality of positions;

determining a schedule of the scheduled path along the estimated route about whether or not to drive the hybrid vehicle using the motor and to charge the battery, the schedule of the scheduled path starting from the determined start point along the estimated route while estimating transition of a remaining quantity of the battery along the estimated route based on the schedule; and starting, when the hybrid vehicle runs on the estimated route and enters the scheduled path starting from the start point, a control over whether or not to drive the hybrid vehicle using the motor and to control charging of the battery in accordance with the determined schedule and continuing the control on the scheduled path.

* * * * *